United States Patent Office 3,773,724
Patented Nov. 20, 1973

3,773,724
1,3,3-TRIMETHYL-BIS(α,t-BUTYLPEROXYISO-PROPYL)-1-PHENYLINDANE
Frederick G. Schappell, Newark, Del., assignor to Hercules Incorporated, Wilmington, Del.
No Drawing. Application Dec. 31, 1969, Ser. No. 889,685, now Patent No. 3,668,259, which is a continuation-in-part of abandoned application Ser. No. 741,850, July 2, 1968. Divided and this application Sept. 29, 1971, Ser. No. 184,955
Int. Cl. C08c *17/28;* C08d *13/28;* C08f *27/00*
U.S. Cl. 260—46.5 G          8 Claims

ABSTRACT OF THE DISCLOSURE 1,3,3-trimethyl-bis(α-t-butylperoxyisopropyl)-1-phenylindanes in which the α-t-butylperoxyisopropyl groups are attached in the 6- and 4'-, 6- and 3'-, 5- and 4'-, 5'- and 3'-, 7- and 4'-, or 7- and 3'-positions are heated in contact with curable polymers whereby crosslinking of the polymer is effected.

---

This application is a division of my copending U.S. application Ser. No. 889,685, filed Dec. 31, 1969, now U.S. 3,668,259, which is in turn a continuation-in-part of application Ser. No. 741,850, filed July 2, 1968, now abandoned.

This invention relates to organic peroxides and, more particularly, to organic peroxides which are non-blooming, odor-free curing agents for olefin polymers, and to compositions capable of being crosslinked therewith.

In Pat. 3,402,205 there is described a class of peroxides in which an aryl nucleus is substituted by two to four t-alkylperoxyisopropyl groups. The aryl nucleus was exemplified by groups containing either one benzene ring or more than one benzene ring joined together directly by fusion or by a single atom.

It has now been found that a bisperoxide of the formula

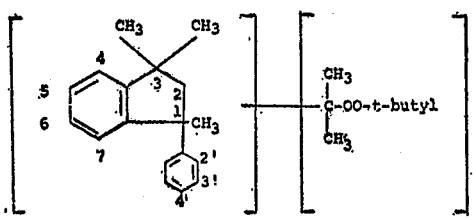

in which each

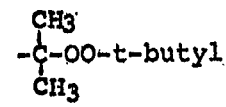

group is attached to a benzene ring is an organic peroxide having excellent curing properties for polyethylene and greater scorch resistance than related bisperoxides and is non-blooming.

The peroxides of this formula have the nucleus of an α-methylstyrene dimer, i.e.,

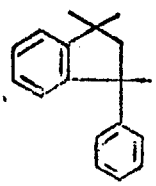

and they can be made by isopropylating α-methylstyrene dimer to a diisopropyl-α-methylstyrene dimer, oxidizing the latter to a bis(α-hydroxyisopropyl)-α-methylstyrene dimer, and reacting this last-named compound with t-butylhydroperoxide. The bisperoxides of this invention can also be made from isomers such as p-isopropyl-α-methylstyrene dimer, or from m-isopropyl-α-methylstyrene dimer.

This group of bisperoxides is exemplified by 1,3,3-trimethyl-6,4'-bis(t - butylperoxyisopropyl)-1-phenylindane which is prepared by oxidizing the dimer of p-isopropyl-α-methylstyrene, i.e., 1,3,3-trimethyl-6,4'-bis(isopropyl)-1-phenylindane to the dialcohol, 1,3,3-trimethyl-6,4'-bis(hydroxyisopropyl)-1-phenylindane, and then reacting the dialcohol with t-butylhydroperoxide to form the 1,3,3-trimethyl-6,4'-bis(t-butylperoxyisopropyl) - 1 - phenylindane.

The process of preparation and a description of the properties of this novel bisperoxide are illustrated in the following examples, in which all parts and percentages are by weight.

EXAMPLE 1

1,3,3-trimethyl-6,4'-bis(isopropyl) - 1 - phenylindane was prepared by heating 100 parts p-isopropyl-α-methylstyrene with 180 parts 80% aqueous sulfuric acid at 80–90° C., with stirring for one hour and recovered by separating the acid layer, washing the organic phase with dilute aqueous sodium hydroxide and water, and distilling to obtain 56 parts of product which melted at 53–54° C.

1,3,3-trimethyl-6,4'-bis(hydroxyisopropyl) - 1 - phenylindane was prepared by dispersing moist oxygen gas into 100 parts of 1,3,3-trimethyl-6,4'-bis(isopropyl)-1-phenylindane while rapidly stirring with 25 parts of 50% aqueous sodium hydroxide at 110–115° C. for about 10 hours and was purified by dissolving in benzene and washing free of salts of acidic materials with 4% aqueous sodium hydroxide, and subsequent countercurrent extraction of an acetonitrile solution thereof with hexane followed by distilling off the acetonitrile.

1,3,3 - trimethyl - 6,4' - bis(t-butylperoxyisopropyl)-1-phenylindane was prepared by heating at 47–60° C. a solution of 32 parts 1,3,3-trimethyl-6,4'-bis(hydroxyisopropyl)-1-phenylindane, 37.2 parts 82% t-butylhydroperoxide and 0.38 part p-toluenesulfonic acid in 100 parts heptane under reflux under reduced pressure with water removal for about 3 hours and, subsequently, purifying by washing with 8% sodium hydroxide and then with water and distilling off the heptane. The yield of bisperoxide was 12.4% of theory as shown by infrared and iodometric analyses.

A sample of the above 1,3,3-trimethyl-6,4'-bis(t-butylperoxyisopropyl)-1-phenylindane was compounded with low density polyethylene at the rate of 1 part peroxide per hundred of polyethylene (1 phr.) and also at the rate of .2 phr. The polyethylene compositions containing also 0.5 phr. antioxidant (AgeRite Resin D—R. T. Vanderbilt Co. trademark for polymerized trimethyl dihydroquinoline) were then vulcanized by heating one part at 177° C. for 10 minutes, and another part at 188° C. for 10 minutes. The results on the product were shown by gel and swell tests as follows:

| Crosslinker level | 10 min., 177° C. | | 10 min., 188° C. | |
|---|---|---|---|---|
|  | Gel | Swell | Gel | Swell |
| 1 | 55 | 4,770 | 73 | 4,050 |
| 2 | 63 | 3,740 | 73 | 4,070 |

A filled sample of polyethylene was similarly prepared and tested using 40 phr. carbon black in addition to 0.5 phr. antioxidant (AgeRite Resin D) and 1 and 2 phr. bisperoxide. The test results were shown by gel and swell tests as follows:

| Crosslinker level | 10 min., 177° C. | | 10 min., 188° C. | |
|---|---|---|---|---|
| | Gel | Swell | Gel | Swell |
| 1 | 54 | 6,400 | 77 | 3,200 |
| 2 | 49 | 5,500 | 70 | 3,160 |

EXAMPLE 2

A mixture of 7 parts of 1,3,3-trimethyl-5,3'-bis(isopropyl)-1-phenylindane and 1 part of 1,3,3-trimethyl-7,3'-bis-(isopropyl)-1-phenylindane was prepared by heating 100 parts of m-isopropyl-α-methylstyrene with 25 parts of 80% aqueous sulfuric acid at about 90° C. with stirring for 1 hour. The product was recovered after dilution with 100 parts of water to facilitate removal of the acid layer. After washing with aqueous sodium hydroxide and water, the organic layer was dried and distilled in the presence of potassium carbonate to yield 34 parts of a liquid, boiling in the range 148–158° C. at 0.85 torr. Gas chromatographic analysis showed the product contained 98.7% phenylindane compounds.

A mixture of 1,3,3-trimethyl-5,3'-bis(hydroxyisopropyl) and 1,3,3-trimethyl-7,3'-bis(hydroxyisopropyl)-1-phenylindane was prepared as in Example 1 by the action of oxygen on 25 parts of the hydrocarbon mixture in the presence of 100 parts of 50% aqueous sodium hydroxide. The reaction was performed at 100–115° C. for about 9 hours, after which 19.2 parts of diol mixture was purified and isolated as described in Example 1.

A mixture of 1,3,3-trimethyl-5,3'-bis(α-t-butylperoxyisopropyl)-1-phenylindane and 1,3,3-trimethyl-7,3'-bis(α-t-butylperoxyisopropyl)-1-phenylindane was prepared by heating 12 parts of the diol mixture with 15 parts 82% t-butylhydroperoxide and 0.38 part p-toluenesulfonic acid in 50 parts heptane under reflux under reduced pressure for 1.75 hours. Purification of the final product was effected as in Example 1.

EXAMPLE 3

A mixture of six diisopropyl-α-methylstyrene dimers composed of the 6,4'-; 6,3'-; 5,4'-; 5,3'-; 7,4'-; and 7,3'-diisopropylated isomers were prepared by heating 100 parts of a 2:1 mixture of m- and p-isopropyl-α-methylstyrene with 100 parts of 80% aqueous sulfuric acid with stirring at 90° C. for 1 hour. The product was worked up and distilled as in Example 2 to give 30 parts of an oil, boiling at 160–175° C. at 1.0–1.1 torr.

Oxidation of 25 parts of this mixture was performed as in Example 1 in the presence of 50 parts 50% aqueous sodium hydroxide at 100–115° C. for 11 hours. After the termination of the oxidation, the product was worked up and purified as in Example 1 to give 11 parts 1,3,3-trimethyl-bis(hydroxyisopropyl)-1-phenylindane (mixed isomers of diols).

1,3,3 - trimethyl - bis(α - t - butylperoxyisopropyl) - 1-phenylindane (mixed isomers) was prepared by heating at 45–61° C. a solution of 10 parts of the mixed diols, 15 parts 82% t-butylhydroperoxide, 0.38 part p-toluenesulfonic acid and 50 parts heptane under reflux under reduced pressure with water removal for 2 hours. Purification of the final product was effected as in Example 1.

EXAMPLE 4

A formulation of EPM (100 parts) 75 phr. MT Black, 5 phr. zinc oxide and 2.35 parts of the bisperoxide of Example 1 was prepared and compared with a similar formulation using 2.7 phr. dicumylperoxide and, also with a similar formulation using 1.7 phr. m-bis(α-t-butylperoxyisopropyl)benzene. These formulations are designated 4A, 4B and 4C, respectively. The compositions 4A, 4B and 4C were separately mixed on a two-roll mill and were sheeted into test strips from which samples were cut for vulcanization testing on the Monsanto Oscillating Disk Rheometer. This rheometer is a device which measures dynamic properties, curing, and processing characteristics of elastomer compositions during the curing cycle. The sample from the test strip (4A, 4B and 4C) was placed in the device, and a disk embedded in the sample was subjected to oscillatory motion by a motor driven eccentric wherein the force (torque) required to oscillate the disc could be measured electronically while heating at controlled temperatures.

The tests were carried out at 320° F. and 330° F. The first torque measurement taken was the minimum reached at initial equilibrium before cure began, T-min. Subsequent torque measurements were taken at intervals of time so as to be able to plot a curve of torque against time. The test was stopped at the time that maximum torque (T-max.) was reached. The time ($t+1$) to reach minimum torque (T-min.) plus 1 torque unit and the time to reach 90% of T-max. was also noted. The results were as follows:

| | Temperature (° F.) | T-min. | T-max. | $T_{90}$ | $t+1$ | $t_{90}$ |
|---|---|---|---|---|---|---|
| 4A | 330 | 27.8 | 38.0 | 34.2 | 4.6 | 23.0 |
| 4B | 320 | 34.0 | 48.6 | 43.7 | 2.6 | 14.5 |
| 4C | 330 | 33.2 | 46.0 | 41.4 | 2.8 | 16.5 |

These results show that the compound of this invention (4A) requires a longer time for $T_{90}$ to be reached, and this is indicative that the compound of this invention has a longer half-life than either of the related peroxides of 4B or 4C. The lower scorch resistance of the compound is attributed to the longer half-life. The longer half-life is also advantageous in controlling extent of curing of the polymer compositions.

In crosslinking of crosslinkable polymers in accordance with this invention, the crosslinkable polymer is admixed with the bisperoxide of the present invention by any of the usual techniques conventionally employed in the elastomer field, as, for instance, by passage through mixing rolls or by dispersion using conventional mixers.

The crosslinkable polymers which are particularly used in this process are polyethylene, natural rubber, polystyrene, polyisoprene, cis-4-polybutadiene, poly(chloroprene), silocone rubber, EPM, EPDM, SBR, and NBR. These may be unfilled or filled with the usual black and non-black fillers useful in compounding of these polymers.

EPM is an elastomeric ethylene-propylene copolymer and EPDM is an elastomeric terpolymer of ethylene, propylene and a diene such, for example, as 1,4-hexadiene and dicyclopentadiene. The latter M in the above designation indicates elastomers having a saturated chain of the polymethylene type—see ASTM Designation: D1418-67. NBR is nitrile-butadiene rubber, SBR is styrene-butadiene rubber.

What I claim and desire to protect by Letters Patent is:

1. A composition capable of being crosslinked by heating comprising a polymeric material of the group consisting of polyethylene, natural rubber, polystyrene, polyisobutylene, cis-4-polybutadiene, poly(chloroprene), silicone rubber, ethylene-propylene copolymer, terpolymers of ethylene, propylene and a diene, styrene-butadiene rubber and nitrile-butadiene rubber and a crosslinking amount of a bisperoxide having the formula

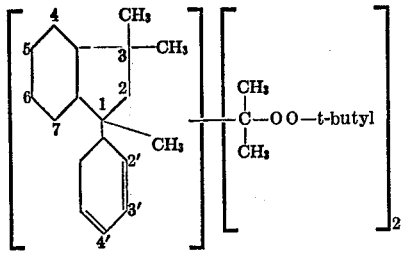

wherein each

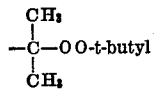

group is attached to a benzene ring.

2. A composition capable of being crosslinked by heating comprising a polymeric material of the group consisting of polyethylene, natural rubber, polystyrene, polyisobutylene, cis-4-polybutadiene, poly(chloroprene), silicone rubber, ethylene-propylene copolymer, terpolymers of ethylene, propylene and a diene, styrene-butadiene rubber and nitrile-butadiene rubber and a crosslinking amount of the bisperoxide of claim 1 wherein a t-butylperoxyisopropyl group is attached to each benzene ring.

3. A composition capable of being crosslinked by heating comprising polyethylene and a crosslinking amount of the bisperoxide of claim 1 wherein a t-butylperoxyisopropyl group is attached to each benzene ring.

4. A composition capable of being crosslinked by heating comprising polyethylene and a crosslinking amount of the bisperoxide of claim 1 wherein the t-butylperoxyisopropyl groups are attached at positions 6 and 4'.

5. A composition capable of being crosslinked by heating comprising polyethylene and a crosslinking amount of the bisperoxide of claim 1 wherein the t-butylperoxyisopropyl groups are attached at positions 5 and 3'.

6. A composition capable of being crosslinked by heating comprising polyethylene and a crosslinking amount of the bisperoxide of claim 1 wherein the t-butylperoxyisopropyl groups are attached at positions 7 and 3'.

7. A compostion capable of being crosslinked by heating comprising polyethylene and a crosslinking amount of a isomeric mixture of the bisperoxide of claim 1 wherein the t-butylperoxyisopropyl groups are attached at positions 5 and 3' in one isomer and at 7 and 3' in the other.

8. A composition capable of being crosslinked by heating comprising polyethylene and a crosslinking amount of a isomeric mixture of the bisperoxide of claim 1 wherein the t-butylperoxyisopropyl groups are attached at positions 6 and 4', 6 and 3', 5 and 4', 5 and 3', 7 and 4', and 7 and 3'.

References Cited
UNITED STATES PATENTS

| | | | |
|---|---|---|---|
| 3,668,259 | 6/1972 | Schappell | 260—94.9 GA |
| 3,658,914 | 4/1972 | Gregory | 260—610 R |
| 3,402,205 | 9/1968 | Gregory | 260—610 B |

JOSEPH L. SCHOFER, Primary Examiner

A. HOLLER, Assistant Examiner

U.S. Cl. X.R.

260—46.5 G, 80.7, 80.78, 83.3, 85.1, 88.2 S, 92.3, 93.5 A, 94.7, 94.8, 773

UNITED STATES PATENT OFFICE
CERTIFICATE OF CORRECTION

Patent No. 3,773,724　　　　　　　Dated November 20, 1973

Inventor(s) Frederick G. Schappell

It is certified that error appears in the above-identified patent and that said Letters Patent are hereby corrected as shown below:

Printed Patent Column 1, line 17 of the Abstract of Disclosure; Specification page 1, line 16 of the Abstract of Disclosure -

" 5' " should read -- 5 --

Printed Patent Column 5, Claim 1; (Formula)

Printed Patent reads:　"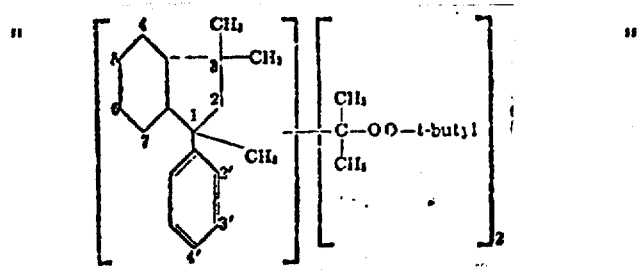"

Specification Claim 1, (Formula) - should read;

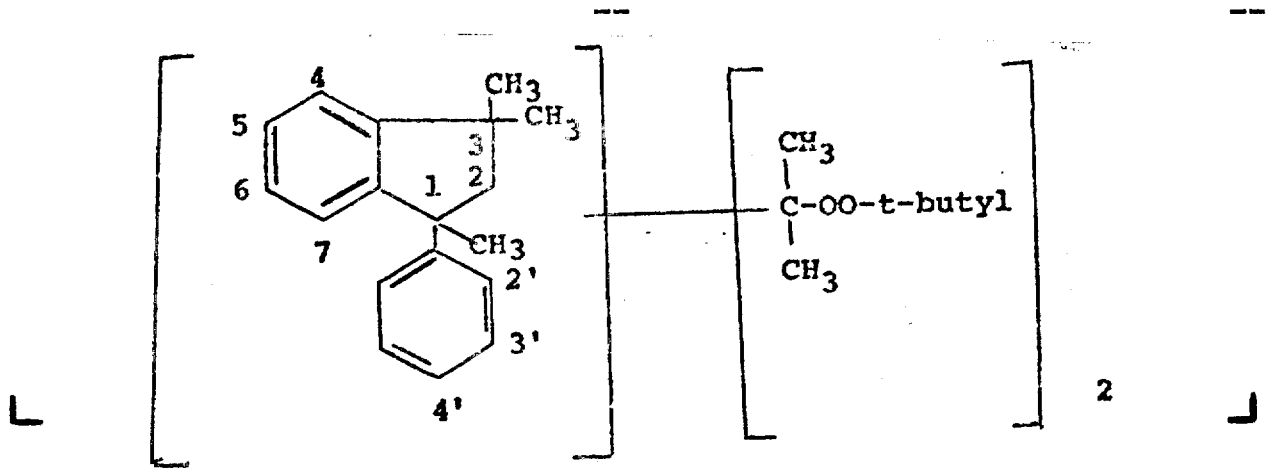

Signed and sealed this 23rd day of April 1974.

(SEAL)
Attest:

EDWARD M. FLETCHER, JR.　　　　　　C. MARSHALL DANN
Attesting Officer　　　　　　　　　　Commissioner of Patents